United States Patent [19]

Wagener

[11] Patent Number: 4,652,396

[45] Date of Patent: Mar. 24, 1987

[54] ELECTRICALLY CONDUCTIVE POROUS SYNTHETIC POLYMERIC COMPOSITIONS, METHOD FOR MAKING SAME, AND USE THEREOF IN AN ELECTRODIALYSIS PROCESS

[75] Inventor: Kenneth B. Wagener, Asheville, N.C.

[73] Assignee: Akzona Incorporated, New York, N.Y.

[21] Appl. No.: 492,071

[22] Filed: May 6, 1983

[51] Int. Cl.$^4$ .............................................. H01B 1/00
[52] U.S. Cl. .................................... 252/500; 252/512; 252/518; 524/80; 524/401; 525/248; 525/275
[58] Field of Search ................. 521/27; 252/500, 512, 252/518; 524/80, 401; 526/285; 525/248, 275

[56] References Cited

U.S. PATENT DOCUMENTS

| | | | |
|---|---|---|---|
| 4,222,903 | 9/1980 | Heeger et al. | 252/500 |
| 4,394,304 | 7/1983 | Wrek | 252/500 |
| 4,397,971 | 8/1983 | Hocker et al. | 524/40 |
| 4,519,939 | 5/1985 | Hocker et al. | 252/500 |

Primary Examiner—Josephine Barr
Attorney, Agent, or Firm—Francis W. Young; Robert F. Green; Louis A. Morris

[57] ABSTRACT

There is disclosed a method for increasing the electrical conductivity of a porous synthetic polymeric material. The method comprises depositing an effective amount of a polyacetylene polymerization catalyst throughout the porous structure, subsequently exposing said material to acetylene under polymerization conditions, for a time sufficient to form polyacetylene within the porous structure, and finally doping the resultant product with a conductivity modifying amount of either an electron donor dopant or an electron acceptor dopant.

There is also disclosed an improved electrodialysis process wherein an electrolyte solution is placed between opposite faces of two membranes, the first membrane being an anion exchange membrane and the second membrane being a cation exchange membrane, while being subjected to a primary electric field causing the cations in the electrolyte to pass through the cation exchange membrane and the anions to pass through the anion exchange membrane. The improvement comprises using as the cation and anion exchange membranes electrically conductive membranes on which secondary negative and positive potentials are induced, respectively, the strength of the secondary potential being less than that induced by the primary electric field.

7 Claims, 13 Drawing Figures

ELECTRICALLY CONDUCTIVE POROUS SYNTHETIC POLYMERIC COMPOSITIONS, METHOD FOR MAKING SAME, AND USE THEREOF IN AN ELECTRODIALYSIS PROCESS

BACKGROUND OF THE INVENTION

This application relates to new electrically conductive polymeric materials, more particularly to compositions comprised of doped polyacetylene deposited throughout porous polymeric substrates, electrically conductive membranes, and methods for both the preparation and use of the foregoing.

Recently, polyacetylene has been successfully synthesized in the form of high quality uniformly thin flexible silvery-copper-colored polycrystalline films of cis-polyacetylene and silvery polycrystalline films of trans-polyacetylene, by polymerizing acetylene monomer in the presence of a $Ti(OC_4H_9)_4$—$Al(C_2H_5)_3$ catalyst system, employing a critical catalyst concentration to avoid the formation of polyacetylene powder, and critical polymerization temperatures (temperatures lower than $-78°$ C. for obtaining the cis polymer, and temperatures higher than $150°$ C. for obtaining the trans polymer). Polymerization temperatures between $-78°$ C. and $150°$ C. result in the polymer having a mixed cis-trans structure. The details of the synthesis of these polycrystalline films of polyacetylene and their characterization are described in a series of papers by Shirakawa et al (Polymer Journal, Volume 2, No. 2, pages 231–244, 1971; Polymer Journal, Volume 4, No. 4, pages 460–462, 1973; Journal of Polymer Science, Part A-1, Polymer Chemistry Edition, Volume 12, pages 11–20, 1974; and Journal of Polymer Science, Part A-1, Polymer Chemistry Edition, Volume 13, pages 1943–1950, 1975), all of which are incorporated herein by reference.

The polycrystalline films of trans-polyacetylene and cis-polyacetylene described by Shirakawa et al, are both p-type semiconducting materials, but varying in room temperature electrical conductivity. The room temperature electrical conductivity of the trans-polyacetylene is typically about $4.4 \times 10^{-5}$ ohm$^{-1}$ cm$^{-1}$, while that of the cis polyacetylene is typically about $1.7 \times 10^{-9}$ ohm$^{-1}$ cm$^{-1}$, depending on the method of preparation.

It has also recently been found that by controlled chemical doping of polyacetylene in the form of a polycrystalline film, such as those described by Shirakawa et al, with a conductivity-increasing amount of an electron acceptor dopant and/or a conductivity-decreasing amount of an electron donor donant, it is possible to produce a whole family of p-type electrically conducting doped polyacetylene films whose room temperature electrical conductivity may be preselected over the entire range characteristic of semiconductor behavior and into the range characteristic of metallic behavior. Such doping procedure is described in U.S. Pat. No. 4,222,903, and is incorporated herein by reference. As disclosed in said U.S. patent, high levels of room temperature p-type electrical conductivity characteristic of or approaching metallic behavior, i.e., on the order of about $10^{-1}$ to about $10^3$ ohm$^{-1}$ cm$^{-1}$, can be achieved with a number of electron acceptor dopants, including bromine, iodine, iodine chloride, iodine bromide and arsenic pentafluoride, at dopant levels ranging from less than 0.001 to about 0.3 mol of dopant per —CH— unit of the polyacetylene, with lower doping levels resulting in proportionally lower conductivity increases.

In U.S. Pat. No. 4,204,216 a method is disclosed for modifying the electrical conductivity of polycrystalline films of polyacetylene so as to provide at least a portion thereof with a preselected room temperature n-type electrical conductivity, by doping the polyacetylene with certain metal compounds.

Although the foregoing references adequately teach a means for producing polyacetylene films and for altering the eletrical conductivity of such films, a serious drawback exists in that the polyacetylene films are quite fragile and are thus very susceptible to mechanical shock. It is envisioned that in certain applications a membrane, such as a microporous membrane, may have particular advantages if it is also electrically conductive.

SUMMARY OF THE INVENTION

Figure 1:
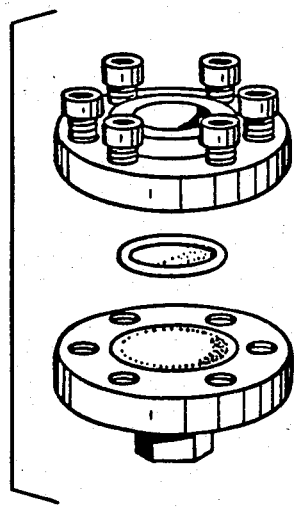
FIG. 1 is a schematic drawing of an apparatus used for determining bubble point.

There has now been discovered a method for increasing the electrical conductivity of a porous synthetic polymeric material comprising depositing an effective amount of a polyacetylene polymerization catalyst throughout the porous structure, subsequently exposing said material to acetylene under polymerization conditions, for a time sufficient to form polyacetylene within the porous structure, and finally doping the resultant product with a conductivity modifying amount of either an electron donor dopant or an electron acceptor dopant.

There has also been discovered a new composition comprised of doped polyacetylene deposited throughout a porous polymeric substrate as well as porous polymeric structures which exhibit the conductive properties of doped polyacetylene.

Electrically conductive membranes have also been discovered which exhibit both the physical properties of a membrane and the electrical properties of doped polyacetylene.

An improved electrodialysis process is disclosed. In a typical electrodialysis process, an electrolyte solution is placed between opposite faces of two membranes, one of which is an anion exchange membrane and the other is a cation exchange membrane, while being subjected to a primary electric field causing the cations in the electrolyte to pass through the cation exchange membrane and the anions to pass through the anion exchange membrane, thus desalting the electrolyte solution. In the improved process of the present invention, the cation and anion exchange membranes are replaced by electrically conductive membranes on which secondary negative and positive potentials are induced, respectively. The strength of the secondary potential is less than that induced by the primary electric field.

DETAILED DESCRIPTION OF THE PREFERRED EMBODIMENTS

It has now been discovered, as stated above, that new electrically conductive polymeric structures can be made. These structures have essentially the same physical integrity as the porous structures from which they are derived. Thus, the very fragile nature of polyacetylene is not present, and consequently numerous new application areas are now available for conductive polymeric structures.

The starting material used in the present invention is a porous polymeric structure. Although it is believed that any porous polymeric structure may be employed, synthetic polymers are typically used, especially synthetic thermoplastic polymers. The polymers should be porous. The term porous is used to mean a structure having a void volume of from about 10 to about 90%, preferably from about 30 to about 70%, and having an average pore size from about 0.001 micron to about 50 microns, preferably from about 0.1 micron to about 1 micron. Thus, useful starting materials include membranes, such as those used for microfiltration, ultrafiltration, and reverse osmosis. Preferably, membranes include those polypropylene membranes manufactured by Membrana, Inc. in accordance with U.S. Pat. No. 4,247,498, and sold under the trademark "Accurel", having a pore size rating of 0.2 micron.

In the present process, an effective amount of a polyacetylene polymerization catalyst is deposited throughout the porous structure. Typically the polymerization catalyst which is used is referred to as a "Ziegler-Natta" polymerization catalyst or a "Shirakawa" catalyst solution. The solvent which is used in the preparation of the catalyst solution should be a "suitable solvent". By that term it is meant that the solvent should, of course, dissolve the polyacetylene catalyst. Secondly, the solvent should not dissolve the porous polymeric material. Finally, the solvent should be inert with respect to the catalyst.

Because the catalyst is deposited on the surface of the polymer, there is no requirement that the solvent interact in any way with the polymer, such as to swell the polymer. Thus, the present invention may be carried out in the absence of any swelling of the polymer. However, in certain instances it may be advantageous to use a solvent which does cause some swelling of the polymer, but such would not be a necessary feature of the invention.

It is thus a feature of the present invention that the catalyst may be deposited on the surface of the polymer, without the need for placing the catalyst within the polymer network itself. Of course, by the term "surface", reference is made to the entire surface area of the porous polymeric structure, such as may be calculated based upon the nature of the porosity or may be determined or approximated, for example, by the B.E.T. method, as described in Brunauer, S., Emmett, P. H. and Teller, E., "The Adsorption of Gases in Multimolecular Layers", *J. Am. Chem. Soc.*, 60, 309-16 (1938).

A typical method for depositing an effective amount of polyacetylene polymerization catalyst throughout the porous structure thus comprises contacting the structure with the catalyst dissolved in an appropriate solvent and subsequently drying the structure.

Polymerization of the acetylene is readily accomplished by exposing the structure containing the dried catalyst to acetylene, under polymerization conditions. It is, however, essential that no water or oxygen is present. The polymerization can occur at a temperature from about $-50°$ C. to about $150°$ C., or higher, depending upon the melting point of the substrate polymer. Typically the polymerization will occur at room temperature. The composition of the present invention will comprise from about 16 to about 70% or, preferably, from about 20 to about 40% polyacetylene in the porous polymeric substrate.

Doping of the resultant product is a simple process, employing known procedures. For example, the product can be exposed to argon containing a small amount of iodine for a sufficient period of time, such as four to six hours, to dope the structure to yield a "p" type semi-conductor.

Antioxidants may be added to the products of the present invention to reduce the action of oxygen. Any known oxidant may be employed, such as BHT, BHA, or ascorbic acid.

The present invention will be further described by the following non-limiting examples.

EXAMPLE 1

Preparation of a Polypropylene/Polyacetylene Structure Containing 5.7 wt % Polyacetylene Acetylene is polymerized using an aluminum/titanium catalyst system, prepared as follows. Approximately 200 ml of freshly distilled toluene (dried over $CaH_2$) is transferred to a Schlenk tube using a constant argon purge. The purge involves the use of specially modified ground glass joints on the Schlenk tube such that contact with air is completely eliminated. A magnetic stirring bar is placed in the tube, again keeping an argon blanket in place. Distilled titanium tetrabutylate, 17 ml, is added to the tube which dissolved in the stirred toluene. Neat triethylaluminum, 27 ml, is then slowly added to the solution, which results in the formation of a very dark color and the evolution of a gas. Additions are made with dried syringes at ambient temperatures. The catalyst solution, a Shirakawa strength catalyst solution, is aged for approximately three hours.

Samples of microporous polypropylene are prepared for treatment with the catalyst solution. The microporous polypropylene (Accurel®) have the following membrane properties:

| Microporous Polypropylene Rated Pore Size $0.2\mu$ | |
| --- | --- |
| Thickness | 7.0 mils |
| Maximum Pore Size | $0.55\mu$ |
| IPA Bubble Point | 16.6 psi |

| Microporous Polypropylene Rated Pore Size 0.2μ | |
|---|---|
| Air Flow | 1.3 1/cm²/min @ 10 psi |
| Pore Former (Armostat 310) | <0.1% |
| Burst Strength | 17.9 psi |
| Shrinkage, machine direction | 1.3% |
| Shrinkage, cross machine direction | 0.4% |

A 0.8470 g sample of the above membrane is placed in a dry box via an evacuated antichamber. The Schlenk tube containing the catalyst solution described above is moved into the dry box. The following techniques are performed in the dry box atmosphere, which is purified and dried nitrogen.

A 10-ml aliquot of the catalyst solution is diluted with 100 ml of freshly distilled toluene in a beaker. The solution is stirred for five minutes, and then the membrane sample is placed in the solution. The catalyst solution immediately penetrates the microporous structure. The sample is allowed to soak for about five minutes and then allowed to dry in the box under blowing nitrogen for 10–15 minutes giving a membrane with the catalyst components deposited within the pore structure of the polypropylene. Weight of the sample plus the deposited catalyst is 0.8872 g, or a wt % pickup of 4.7%. The sample is placed in an empty Schlenk tube and removed from the dry box.

Polymerization of acetylene within the microporous pore structure is accomplished on a vacuum line in order to assure absolutely no contact with either oxygen or water. A one-liter gas storage bulb is mounted on a vacuum line manifold and evacuated as much as possible (to less than $10^{-5}$ mm). Acetylene from a cylinder is introduced into the bulb until a pressure (measured by a manometer) of 740 mm is attained. The cold finger of the gas storage bulb is immersed in liquid nitrogen to freeze out the acetylene, and the space about the solid acetylene is then exposed to high vacuum (a procedure to remove any oxygen or other gases that might have been present in the acetylene). A vacuum better than $10^{-5}$ is achieved.

The bulb is sealed off from the vacuum line, and the acetylene is allowed to sublime. The pressure in the bulb goes to approximately 600 mm Hg, indicating that dissolved oxygen (or perhaps another gas) indeed was present in the acetylene stream. This procedure is repeated twice to bring the total pressure of acetylene in the storage bulb up to 740 mm Hg. The bulb is left on the vacuum line.

At this point, the Schlenk tube containing the sample is mounted on the vacuum line and evacuated for about 30 minutes, bringing the pressure down to $<10^{-5}$ mm Hg. The vacuum is sealed off from the vacuum manifold thus leaving a pathway between the mounted gas storage bulb containing acetylene and the Schlenk tube. Polymerization is ready to begin.

By controlling the stopcocks on the vacuum manifold, it is possible to slowly introduce acetylene from the bulb into the evacuated Schlenk tube. Only 15 ml of acetylene is introduced at a time with intervals of about 5 minutes. During this period, the sample visually changes, becoming darker with each introduction. After the procedure is repeated five or six times, the stopcocks are opened fully giving a free passageway between the storage bulb and the Schlenk tube. Polymerization continues, as evidenced by a slow reduction in the acetylene gas pressure in the system, and the reaction is continued overnight (about 16 hours).

The polymerization is done at room temperature. The sample eventually changes from the characteristic white color of microporous polypropylene to a deep purple due to the presence of polyacetylene. The purple color is actually a mixture of red and blue, cis-polyacetylene being red and trans being blue. Room temperature polymerization gives a mixture of cis and trans.

Once the polymerization is complete, the Schlenk tube is removed from the vacuum line and taken again into the dry box. The tube is opened and the sample removed. Catalyst is washed from the sample via repeated rinsings with freshly distilled toluene, with the washings being continued until the toluene coming from the sample is colorless. The sample is allowed to dry in the box until no change in weight (with time) is observed. The final weight of the microporous polypropylene/polyacetylene structure is 0.9012 g, or a pickup of 0.0512 g of acetylene. Thus, the weight percentage of polyacetylene in the laminate structure is 5.7%. The structure displays flexibility equal to that of microporous polypropylene alone.

The structure is then doped to give a material with high electrical conductivity, two dopants being investigated, iodine and nitrosonium hexafluorophosphate.

Doping with iodine is relatively easy. An undoped sample is placed in a chamber which is exposed to flowing argon, which contains a low concentration of iodine. The iodine is introduced by passing argon over iodine crystals prior to entering the sample chamber. Sample exposure time normally is four to six hours. The use of iodine gives a "p" doped material.

Using such a procedure, a sample of the microporous polypropylene/polyacetylene structure consisting of 5.7% polyacetylene is doped to the maximum level.

The electrical conductivity of the sample is measured using the 4-probe technique, which has been described in detail elsewhere. The technique consists of mounting a sample of known dimensions on a glass plate with four platinum wires, making contact with the sample using graphite cement (Electrodag 502, Acheson Colloids Co.). A current is applied across the outer two platinum leads, and the voltage across the inter two leads is measured.

The microporous polypropylene has a low conductivity, less than $10^{-16}$ ohm$^{-1}$ cm$^1$. The microporous polypropylene/polyacetylene structure doped with iodine has a conductivity of $7.3 \times 10^{-1}$ ohm$^{-1}$ cm$^{-1}$ representing an increase in conductivity of $10^{17}$. This value compares well with that of pure polyacetylene doped with iodine.

The membrane properties of the microporous polypropylene/polyacetylene structure are measured, and a comparison with the original properties is given below:

| PROPERTY | Microporous Polypropylene Alone | Microporous polypropylene/ polyacetylene Structure |
|---|---|---|
| Thickness, mils | 7.0 | 7.1 |
| Maximum Pore Size, μ | 0.55 | 0.55 |
| IPA Bubble Point, psi | 16.6 | 16.4 |
| N₂ Flow, 1/cm² min @ 10 psi | 1.3 | 1.3 |
| Burst Strength, psi | 17.9 | |
| IPA Flow, 1/cm² min | | 4.13 |

| PROPERTY | Microporous Polypropylene Alone | Microporous polypropylene/ polyacetylene Structure |
|---|---|---|
| -continued | | |
| Water Flow, ml/cm² min | | 8.29 |

Procedures and apparatus used for making these measurements are as follows:

BUBBLE POINT AND MAXIMUM PORE SIZE

To determine the bubble point and maximum pore size for a membrane the following technique is employed (adapted from ASTM method F 316). The necessary apparatus and reagents are:
1. Isopropyl alcohol, ACS reagent grade.
2. Test filter holder consisting of a 47-mm high-pressure stainless steel filter holder (Millipore Cat. No. XX45-047-00 or equivalent) with a 3.50-cm opening machined in the top half and 47-mm downstream support screen (Millipore XX42-047-09 or equivalent); see FIG. 1.
3. Stainless steel forceps with smooth rounded tips, Millipore XX62-000-06 or equivalent.
4. Mirror-backed test gauges, 0–30 psi and 0–100 psi.
5. Pressure regulator, Bellofram Type 10-B, 2–120 psi (or other appropriate range) or equivalent.
6. 3-way ball valve; other valves, fittings, and tubing as required.
7. 47-mm arch punch and hammer.
8. Petri dish or other liquid container.
9. Source of clean compressed nitrogen.
10. Lighted magnifier.

Figure 2:
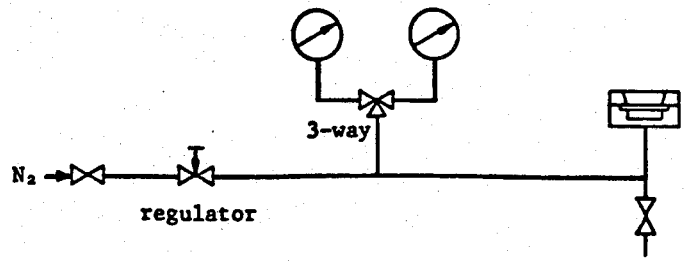
FIG. 2 is a schematic drawing of an apparatus used for determining bubble point.

The procedure is as follows:
1. Assemble the apparatus as shown in FIG. 2.
2. Set the nitrogen supply pressure to the apparatus at ~10 psi above the expected bubble point or 100 psi.
3. Using the punch, cut five 47-mm discs across the width of the sample.
4. Soak each disc in isopropyl alcohol in the petri dish for 15 seconds or until completely wet.
5. With the forceps, place the wet filter disc on the lower half of the filter holder with the dull side of the disc facing down. Put a few drops of isopropyl alcohol on the disc, then add the support screen (side with large holes in contact with the disc) and the top half of the filter holder. Tighten the bolts securely.
6. Pour isopropyl alcohol into the reservoir formed by the hole in the top half of the filter holder to a depth of ~1 cm.
7. Select the 0–30 psi gauge with the 3-way valve.
8. Observe the disc through the magnifier while slowly increasing the pressure until the first steady stream of small bubbles is observed rising through the isopropyl alcohol. Record the pressure (to 0.1 psi) at which bubbles appear. The stream of bubbles which marks the bubble point should come from the center portion of the disc instead of the edges where the disc is clamped.
9. If bubbles have not been observed when the pressure is at 27–28 psi, change the 3-way valve to the 0–100 psi gauge to continue increasing the pressure.
10. After the bubble point has been recorded, reduce the pressure with the regulator and turn off the nitrogen supply to the apparatus.
11. Vent the filter holder by opening the valve at the bottom of the holder.
12. Remove the isopropyl alcohol from the reservoir with a pipette.
13. Disassemble the holder, remove the filter disc and inspect it for obvious holes or defects. Note any defects found.
14. Continue testing as required.
15. Calculate the maximum pore diameter according to the equation $$d(\mu m) = \frac{0.415\gamma}{BP\text{ (psi)}},$$

where $\gamma$=surface tension in dynes/cm. For isoproypl alcohol, the equation reduces to $$d(\mu m) = \frac{9.02}{BP\text{ (psi)}},$$

for temperatures of 20°–25° C.

Thickness

To determine the thickness, the necessary apparatus is a Starret No. 1015A-431 portable dial hand gauge. This gauge with ¼" diameter presser foot exerts a pressure of 2.5 psi (+/−10%) on the sample during a measurement. The procedure is as follows:
1. Using the adjustment screw on the dial gauge, adjust the gauge to read zero when no sample is being measured.
2. With the lever, raise and lower the presser foot several times to check that the reading returns to zero each time.
3. Raise the presser foot and slip the sample between the foot and base plate.
4. Lower the presser foot onto the sample gently and read the thickness, estimating to 0.1 mil.
5. Test the sample thickness at five locations across the full width of the membrane sample.

Burst Strength

The necessary apparatus to determine burst strength is:
1. 13-mm Swinney membrane filter holder, Millipore SX00-013-00 (no support screen), or equivalent, with outlet enlarged to ≧7 mm diameter.
2. Regulator, range 2–60 psi; Bellofram type 10-B, or equivalent.
3. Test gauge, 0–30 psi with maximum pointer, Ashcroft Type 1009S, or equivalent.
4. Stainless steel forceps with smooth rounded tips, Millipore XX62-000-06, or equivalent.
5. Source of clean compressed nitrogen.
6. 13-mm punch and hammer.

Figure 3:
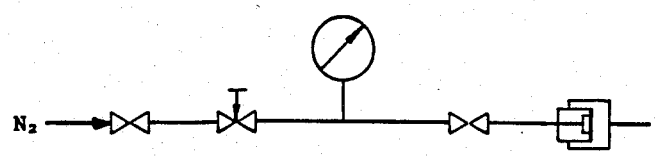
FIG. 3 is a schematic drawing of an apparatus used for determining burst strength.

The procedure is as follows:
1. Set up the apparatus as in FIG. 3.
2. Cut five 13-mm discs across the width of the film, being careful to avoid including obviously defective areas of the film in the samples.
3. Using forceps, insert the disc between the two gaskets of the Swinney cell and screw the cell together tightly. If the film surfaces are different in appearance, place the film in the cell with the dull side toward the gas inlet.
4. Set the maximum pointer on the gauge to zero.
5. Turn on nitrogen and slowly increase the pressure until the membrane bursts.
6. Turn off the nitrogen and reduce the pressure.

7. Read and record the maximum pressure, to 0.1 psi. Reset maximum indicator to zero.
8. Remove the ruptured disc from the cell and examine. If the rupture is not the typical star-type burst, note that fact, and test an additional disc.

Nitrogen Flow Rate

The necessary apparatus to determine nitrogen flow rate
1. Filtered (0.45 um or 0.2 um) nitrogen at 30–50 psi.
2. Pressure regulator, Bellofram type 10B, 2–25 psi, or equivalent.
3. Pressure gauge, 0–30 psi.
4. Millipore stainless steel high pressure 47-mm filter holder, Cat. No. xx45-047-00, or equivalent.
5. Filter forceps with unserrated tips, Millipore XX62-000-06, or equivalent.
6. Magnehelic 0–20 psi differential pressure gauge, Dwyer Instruments Cat. No. 2220, or equivalent.
7. One or more flow meters of appropriate capacity (Matheson type 605 with stainless steel float is standard; different tubes and floats may be required for very high or low flows).

Figure 4:
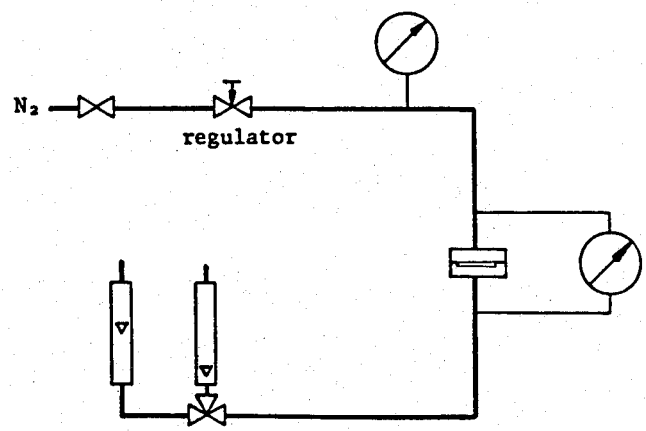
FIG. 4 is a schematic drawing of an apparatus used for determining nitrogen flow rate.

The procedure is as follows:
1. Set up the apparatus as shown in FIG. 4.
2. Using the arch punch, cut five 47-mm discs from each membrane sample to be tested.
3. Using forceps, place the disc in the filter holder with the dull side upstream. Put the top half of the filter holder in place and tighten securely.
4. Open valve B to the desired flow meter (is more than one).
5. Open valve A to admit nitrogen to the apparatus.
6. With the regulator, adjust the pressure to 10 psi on the Magnehelic gauge.
7. Read the flow meter at the middle of the ball and record. If the first is in the bottom or top 10% of the tube, switch to a higher or lower range flow meter if available.
8. Close valve A, disassemble the filter holder and remove the membrane filter. Install the next disc and continue testing.

LIQUID FLOW RATE

To determine the liquid flow rate for a membrane the following technique is employed. The necessary apparatus and reagents are:
1. Isopropyl alcohol.
2. Filtered (0.2 um) deionized water with resistivity of 10 megohm-cm or greater.
3. Millipore stainless steel 47-mm filter holder, Cat. No. XX44-047-00, with Teflon coated support screen, Cat. No. XX44-047-02, and vent/relief valve, Cat. No. XX42-047-08.
4. Filter forceps with unserrated tips, Millipore XX62-000-06, or equivalent.
5. Two stainless steel pressure vessels capable of being pressurized to 50 psi, Millipore XX67-00L-05, or equivalent.
6. Two pressure regulators, Bellofram Type 10B, 2–25 psi (or 2–60 psi), or equivalent.
7. Two pressure gauges (0–30 psi or 0–60 psi as appropriate), preferably mirror-backed test gauges with 0.1 psi divisions.
8. 3-way valve and other fittings, valves, and tubing as necessary.
9. Graduated cylinder and stopwatch or flow meters (Matheson type 60 or equivalent).
10. 47-mm arch punch and hammer.
11. Source of filtered compressed nitrogen.

Figure 5A:
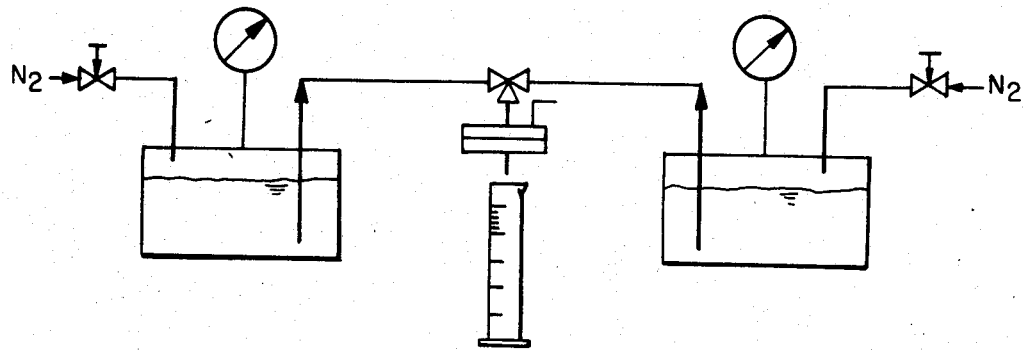
FIGS. 5A and 5B are schematic drawings of an apparatus used for determining liquid flow rate.
Figure 5B:
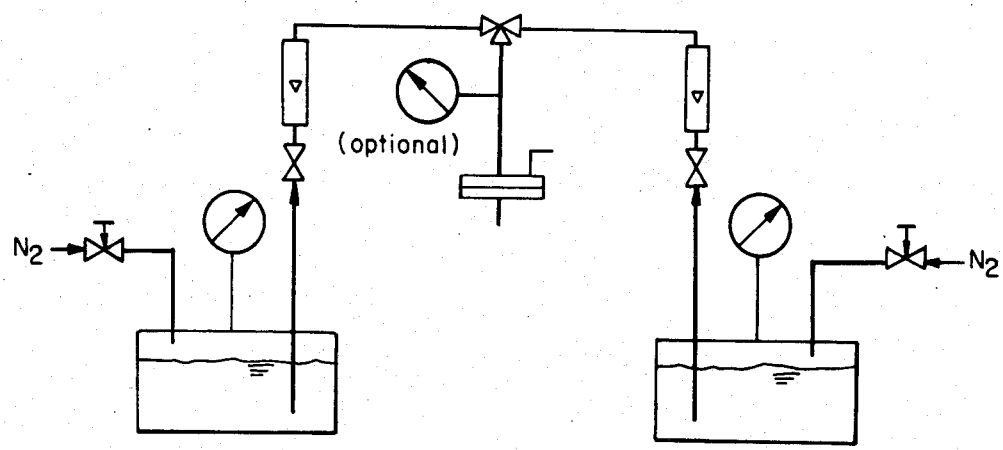

The procedure is as follows:
1. Set up the apparatus as shown in FIGS. 5A or 5B.
2. Fill one pressure vessel with isopropyl alcohol and fill the other with filtered deionized water.
3. Adjust the regulators on the pressure vessels so that the pressure gauges read exactly 10 psi with the outlet valves closed.
4. Using the arch punch, cut five 47-mm discs from each membrane sample to be tested.
5. Using forceps, place the disc in the filter holder with the dull side upstream; assemble the filter holder and tighten it securely.
6. Open the vent valve on the filter holder.
7. Turn the 3-way valve to select isopropyl alcohol and open the outlet valve on the pressure vessel.
8. Allow IPA to flow out the vent valve for a few seconds, then close the valve.
9. If necessary, adjust the regulator so that the pressure is 10 psi (on the optional gauge if installed or in the pressure vessel).
10. Measure the volume of liquid passing through the filter using a graduated cylinder and stopwatch or a flow meter as appropriate.
11. Turn the 3-way valve to select water and open the outlet valve on the pressure vessel and the vent valve on the filter holder.
12. Allow water to flow out the vent valve for a few seconds, then close the valve.
13. If necessary, adjust the pressure to 10 psi.
14. Allow water to flow through the filter at least 15 seconds before measuring the volume.
15. Turn the 3-way valve to the closed position and open the vent valve. Disassemble the filter holder and remove the membrane filter. Install the next disc and continue testing.
16. When appropriate, the flow rate for only one liquid may be determined.

Figure 6:
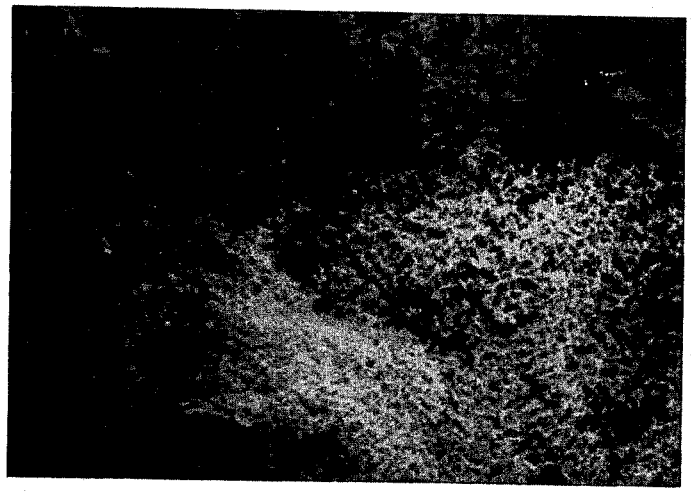
FIG. 6 is a photomicrograph at $2000\times$ of a freeze fracture of the product of Example 1.
Figure 7:
FIG. 7 is a photomicrograph at $2000\times$ of a freeze fracture of the original porous structure used as a substrate for Examples 1 through 4.

Clearly, the structure retained microporous membrane properties, which could have a variety of uses. The microporous nature of the structure is also seen in the scanning electron micrograph, FIG. 6. Little change in structure, as compared with the original as shown in FIG. 7, can be detected. Also, there is no detectable change in flexibility.

The conductivity of doped polyacetylene is known to be transient when the polymer is exposed to oxygen and/or water. The structure prepared as described in this example exhibit similar properties. Table I shows how the laminate's resistivity increases with time.

TABLE I

CHANGE IN THE CONDUCTIVITY OF IODINE DOPED MICROPOROUS POLYPROPYLENE/POLYACETYLENE STRUCTURE CONTAINING 5.7% POLYACETYLENE UPON EXPOSURE TO AIR

| Time, hrs. | Conductivity ohm$^{-1}$ cm$^{-1}$ |
|---|---|
| 0 | $9.7 \times 10^{-1}$ |
| 1 | $7.1 \times 10^{-1}$ |
| 18 | $4.8 \times 10^{-1}$ |
| 42 | $3.1 \times 10^{-1}$ |
| 71 | $2.2 \times 10^{-1}$ |
| 89 | $1.7 \times 10^{-1}$ |
| 186 | $5.4 \times 10^{-2}$ |
| 211 | $4.4 \times 10^{-2}$ |
| 233 | $3.5 \times 10^{-2}$ |
| 259 | $2.6 \times 10^{-2}$ |
| 329 | $1.3 \times 10^{-2}$ |
| 353 | $9.6 \times 10^{-3}$ |

TABLE I-continued

CHANGE IN THE CONDUCTIVITY OF IODINE DOPED MICROPOROUS POLYPROPYLENE/POLYACETYLENE STRUCTURE CONTAINING 5.7% POLYACETYLENE UPON EXPOSURE TO AIR

| Time, hrs. | Conductivity ohm$^{-1}$ cm$^{-1}$ |
|---|---|
| 384 | $6.5 \times 10^{-3}$ |

The structure is also doped using nitrosonium hexafluorophosohate, NOPF$_6$. The technique is simple, and via the chemistry involved yields a "p" doped system carrying the PF$_6$ anion on the polymer chain. Doping consists of soaking a piece of the microporous polypropylene/polyacetylene structure in a mixed solvent of nitromethane/methylene chloride (2:3 by volume) containing approximately 1% dissolved NOPF$_6$. The doping time is four minutes, which yields a laminate having a conductivity of $3.8 \times 10^{-2}$ ohm$^{-1}$ cm$^{-1}$. Changes in conductivity in air for this doped laminate are given in Table II.

TABLE II

CHANGE IN THE CONDUCTIVITY OF NOPF$_6$ DOPED MICROPOROUS POLYPROPYLENE/POLYACETYLENE STRUCTURE CONTAINING 5.7% POLYACETYLENE UPON EXPOSURE TO AIR

| Time, hrs. | Conductivity ohm$^{-1}$ cm$^{-1}$ |
|---|---|
| 0 | $3.8 \times 10^{-2}$ |
| 1 | $2.2 \times 10^{-2}$ |
| 18 | $1.0 \times 10^{-2}$ |
| 42 | $3.0 \times 10^{-3}$ |
| 71 | $9.0 \times 10^{-4}$ |
| 89 | $7.0 \times 10^{-4}$ |
| 186 | $3.8 \times 10^{-5}$ |
| 211 | $3.3 \times 10^{-5}$ |
| 233 | $1.3 \times 10^{-5}$ |
| 259 | $7.5 \times 10^{-6}$ |
| 329 | $2.0 \times 10^{-6}$ |

EXAMPLE 2

Preparation of a Microporous Polypropylene/Polyacetylene Structure Containing 13.5 wt % Polyacetylene The procedure followed in this example is virtually the same as described in Example 1 except for the change in the concentration of the catalyst.

A 25-ml aliquot of the original Shirakawa catalyst is diluted with 100 ml of freshly distilled toluene, and a 0.8441 g sample of polypropylene membrane, taken from the same lot as that used in Example 1, was soaked in this solution as before. The sample weighs 0.9328 g after catalyst pickup, or an increase in weight of 10.5%.

Figure 8:
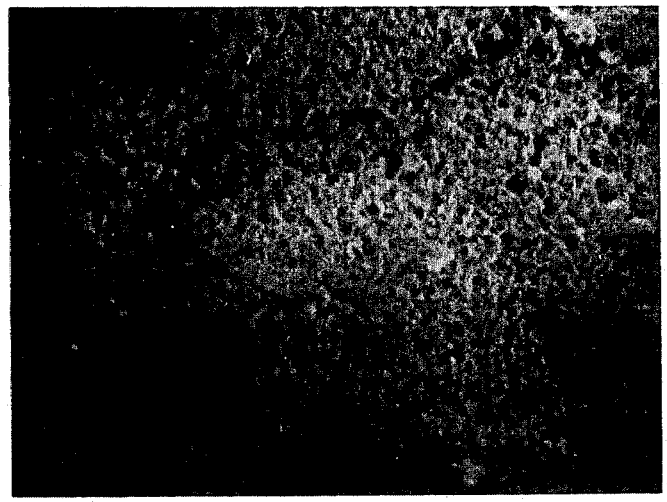
FIG. 8 is a photomicrograph at $2000\times$ of a freeze fracture of the product of Example 2.

After acetylene polymerization and washing to remove catalyst, the sample weighs 0.9763 g. Thus, the structure contains 13.5% polyacetylene. No change in flexibility is noted, and the structure still is microporous as shown by the SEM photograph in FIG. 8. The laminate is dark with an obvious purple hue.

Doping with iodine improves the conductivity of the structure to $7.3 \times 11^{-1}$ ohm$^{-1}$ cm$^{-1}$. Table III shows how the conductivity changes with time upon exposure to air.

TABLE III

CHANGE IN THE CONDUCTIVITY OF IODINE DOPED MICROPOROUS POLYPROPYLENE/POLYACETYLENE STRUCTURE CONTAINING 13.5% POLYACETYLENE UPON EXPOSURE TO AIR

| Time, hrs. | Conductivity ohm$^{-1}$ cm$^{-1}$ |
|---|---|
| 0 | $7.3 \times 10^{-1}$ |
| 1 | $7.1 \times 10^{-1}$ |
| 18 | $4.8 \times 10^{-1}$ |
| 42 | $3.1 \times 10^{-1}$ |
| 71 | $2.2 \times 10^{-1}$ |
| 89 | $1.7 \times 10^{-1}$ |
| 186 | $5.4 \times 10^{-2}$ |
| 211 | $4.4 \times 10^{-2}$ |
| 233 | $3.5 \times 10^{-2}$ |
| 259 | $2.6 \times 10^{-2}$ |
| 329 | $1.3 \times 10^{-2}$ |
| 353 | $9.6 \times 10^{-3}$ |
| 384 | $6.5 \times 10^{-3}$ |

Doping is also done using NOPF$_6$ as in Example 1, giving an initial conductivity of 1.03 ohm$^{-1}$ cm$^{-1}$. Table IV shows the change in conductivity with time in air.

TABLE IV

CHANGE IN THE CONDUCTIVITY OF NOPF$_6$ DOPED MICROPOROUS POLYPROPYLENE/POLYACETYLENE STRUCTURE CONTAINING 13.5% POLYACETYLENE UPON EXPOSURE TO AIR

| Time, hrs. | Conductivity ohm$^{-1}$ cm$^{-1}$ |
|---|---|
| 0 | 1.03 |
| 1 | $9.1 \times 10^{-1}$ |
| 18 | $5.9 \times 10^{-1}$ |
| 42 | $3.5 \times 10^{-1}$ |
| 71 | $2.3 \times 10^{-1}$ |
| 89 | $1.8 \times 10^{-1}$ |
| 186 | $4.6 \times 10^{-2}$ |
| 211 | $3.9 \times 10^{-2}$ |
| 233 | $2.8 \times 10^{-2}$ |
| 259 | $2.0 \times 10^{-2}$ |
| 329 | $8.5 \times 10^{-3}$ |
| 353 | $5.5 \times 10^{-3}$ |
| 384 | $4.3 \times 10^{-3}$ |

EXAMPLE 3

Preparation of a Microporous Polypropylene/Polyacetylene Structure Containing 18.0 wt % Polyacetylene The procedure followed here is virtually the same as described in Example 1 except for a change in the concentration of the catalyst.

A 50-ml aliquot of the original Shirakawa catalyst is diluted with 100 ml of freshly distilled toluene, and a 0.9597 g sample of polypropylene membrane, taken from the same lot as before, is soaked in this solution. The sample weights 1.1266 g after catalyst pickup, or an increase in weight of 17.4%.

Figure 9:
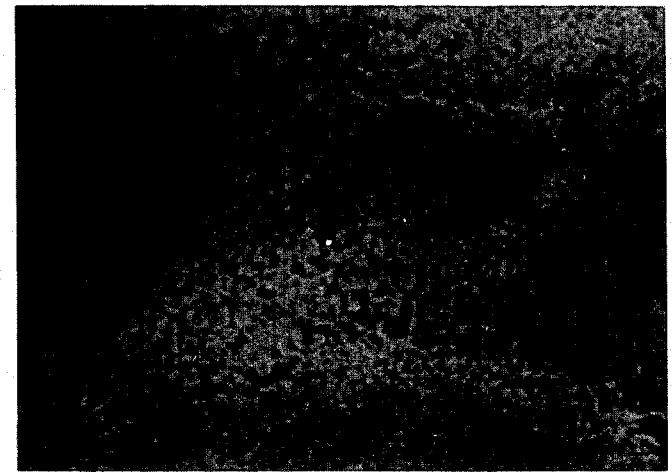
FIG. 9 is a photomicrograph at $2000\times$ of a freeze fracture of the product of Example 3.

After acetylene polymerization and washing with toluene to remove catalyst, the sample weighs 1.1703 g. Thus, the structure contained 18.0% polyacetylene. No change in flexibility was noted, and the structure still is microporous as shown by the SEM photograph in FIG. 9. The structure was very dark in color with a detectable purple hue.

Doping with iodine improved the conductivity of the structure to 1.92 ohm$^{-1}$ cm$^{-1}$. Table V shows how the conductivity changes with time upon exposure to air.

TABLE V
CHANGE IN THE CONDUCTIVITY OF IODINE DOPED MICROPOROUS POLYPROPYLENE/POLYACETYLENE STRUCTURE CONTAINING 18.0% POLYACETYLENE UPON EXPOSURE TO AIR

| Time, hrs. | Conductivity ohm$^{-1}$ cm$^{-1}$ |
|---|---|
| 0 | 1.92 |
| 1 | 1.83 |
| 18 | 1.31 |
| 42 | $9.3 \times 10^{-1}$ |
| 71 | $7.0 \times 10^{-1}$ |
| 89 | $8.1 \times 10^{-1}$ |
| 186 | $2.8 \times 10^{-1}$ |
| 211 | $2.4 \times 10^{-1}$ |
| 233 | $2.1 \times 10^{-1}$ |
| 259 | $1.8 \times 10^{-1}$ |
| 329 | $1.2 \times 10^{-1}$ |
| 353 | $9.5 \times 10^{-2}$ |
| 384 | $7.2 \times 10^{-2}$ |

Doping is done also using NOPF6, as in Example 1, giving an initial conductivity of 1.21 ohm$^{-1}$ cm$^{-1}$. Table VI shows the change in conductivity with time in air.

TABLE VI
CHANGE IN THE CONDUCTIVITY OF NOPF DOPED MICROPOROUS POLYPROPYLENE/POLYACETYLENE STRUCTURE CONTAINING 18.0% POLYACETYLENE UPON EXPOSURE TO AIR

| Time, hrs. | Conductivity ohm$^{-1}$ cm$^{-1}$ |
|---|---|
| 0 | 1.21 |
| 1 | 1.10 |
| 18 | $7.4 \times 10^{-1}$ |
| 42 | $4.6 \times 10^{-1}$ |
| 71 | $2.9 \times 10^{-1}$ |
| 89 | $2.4 \times 10^{-1}$ |
| 186 | $6.5 \times 10^{-2}$ |
| 211 | $5.7 \times 10^{-2}$ |
| 233 | $3.8 \times 10^{-2}$ |
| 259 | $2.7 \times 10^{-} = y2$ |
| 329 | $1.2 \times 10^{-2}$ |
| 353 | $7.2 \times 10^{-3}$ |
| 384 | $6.1 \times 10^{-3}$ |

EXAMPLE 4
Preparation of a Microporous Polypropylene/Polyacetylene Structure Containing 4.3 wt. % Polyacetylene The procedure followed in this experiment is virtually the same as described in Example 1 except for a change in the concentratin of the catalyst.

A 5-ml aliquot of the original Shirakawal catalyst is diluted with 100 ml of freshly distilled toluene, and a 0.6905 g sample of microporous polypropylene membrane, taken from the same lot as used in Example 1, is soaked in this solution. The sample weighs 0.6944 g after catalyst pickup, or an increase of 0.56%.

Figure 10:
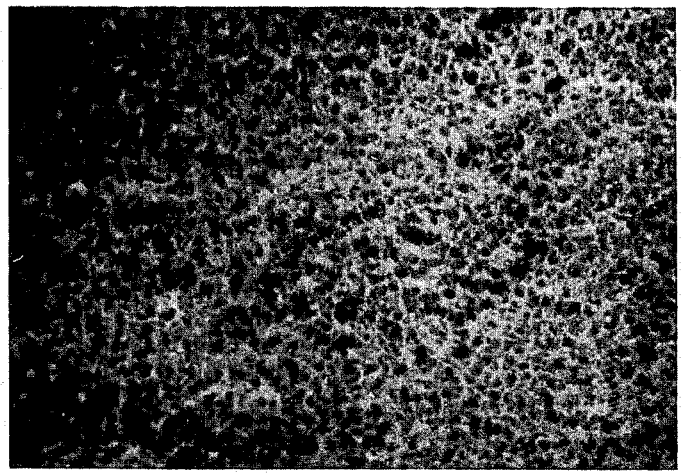
FIG. 10 is a photomicrograph at $2000\times$ of a freeze fracture of the product of Example 4.

After acetylene polymerization and washing to remove catalyst, the sample weighs 0.7201 g. Thus, the structure contains 4.3% polyacetylene. No change in flexibility is noted, and the structure still is microporous as shown by the SEM photograph in FIG. 10. Only a very light purple color is evident on the structure.

The structure cannot be made to be conductive via doping with either iodine or NOPF$_6$. Apparently a lack of continuity exists with this low level of polyacetylene.

Composites containing polyacetylene within the polypropylene network itself could be prepared if the catalyst solution could be impregnated within the morphology of polypropylene. The following three comparative examples describe attempts to carry out the catalyst impregnation.

EXAMPLE 5
Comparative Attempt to Form Microporous Polypropylene/Polyacetylene Composites using the Shirakawa Catalyst System.
A Room Temperature Soaking Experiment A Shirakawa catalyst was prepared as described in Example 1 and moved into a dry box for further work. In the dry box, a 0.7801 g sample of microporous polypropylene taken from the same lot as in Example 1 is placed in the Schlenk tube containing the catalyst solution, and the sample is allowed to soak in the solution for 16 hours. After soaking, the sample is removed and washed with copious amounts of toluene to remove any catalyst deposited on the surface. After washing, the sample is allowed to dry.

The dry box sample is placed in an empty Schlenk tube and transferred from the dry box to the vacuum line for exposure to purified acetylene (the technique used is identical to that in Example 1). Exposure to acetylene does not lead to polymerization, however. No color change is evident in the sample, and no increase in weight is measured after exposure. Thus, a composite is not formed.

EXAMPLE 6
Comparative Attempt to Form Microporous Polypropylene/Polyacetylene Composites using the Shirakawa Catalyst System
An Elevated Temperature Soaking Experiment A 0.8112 g sample of microporous polypropylene is soaked in Shirakawa catalyst as described in Example 5 except that the temperature is increased from room temperature to 100° C., the intent being to more aggressively attempt to impregnate catalyst solution into polypropylene. The sample is washed and dried and exposed to acetylene as before. No polymerization is evident, and no increase in sample weight is noted.

EXAMPLE 7
Comparative Attempt to Form Microporous Polypropylene/Polyacetylene Composites using the Shirakawa Catalyst System
An Elevated Temperature Soaking Experiment A 0.8317 g sample of microporous polypropylene is soaked in Shirakawa catalyst as described in Example 5 except that the temperature is increased from room temperature to 100° C. In addition, the polymerization of acetylene is attempted at elevated temperature (100° C.) as well. No polymerization is evident, and no increase in sample weight is noted.

A fast method for determining if structures of polyacetylene and a substrate can be made involves the use of the Luttinger catalyst system, since absolute exclusion of oxygen and water is not necessary. Examples 8 to 10 describe the use of the Luttinger catalyst system for two different grades of microporous polypropylene and for Kapton ® polyimide film.

EXAMPLE 8

Use of the Luttinger Catalyst System to Make Microporous Polypropylene/Polyacetylene Structures The Luttinger catalyst is prepared as follows. Sodium borohydride, 0.020 g, is dissolved in 50 ml of absolute ethanol with stirring, and the solution is then cooled to −76° C. in a dry ice bath. To this solution is added 1 ml of a 1.0 wt % solution of cobalt nitrate in absolute ethanol. The solutions are made under ambient conditions with no attempt to exclude air or water. However, after the catalyst is made, an argon blanket is placed over the solution.

Samples of microporous polypropylene taken from the same lot used for Examples 1–7, are dipped in the catalyst solution and quickly placed in a chamber full of flowing acetylene. Polymerization occurs immediately.

The structures are doped with iodine using the procedures described previously, and their conductivity are measured as before. Initial conductivity is $1.5 \times 10^{-1}$ ohm$^{-1}$ cm$^{-1}$. The decay in conductivity with time, on exposure to air, is similar to that observed before.

The effect of soak time in the Luttinger catalyst is also studied. Samples are dipped quickly once, dipped quickly five times, soaked for three seconds, for five seconds, for ten seconds, and for one minute, then exposed to acetylene. No change in performance is observed.

EXAMPLE 9

Use of the Luttinger Catalyst System to Make Microporous Polypropylene/Polyacetylene Structures In order to investigate the effect of pore size on microporous polypropylene/polyacetylene conductivity, samples of 0.1 Accurel ® microporous polypropylene are treated with the Luttinger catalyst using the method described in Example 9. Properties of the sample are:

| MICROPOROUS POLYPROPYLENE RATED PORE SIZE 0.1μ | |
| --- | --- |
| Thickness | 3.9 mils |
| Maximum Pore Size | 0.31μ |
| IPA Bubble Point | 30.0 psi |
| Air Flow | 0.1 l/cm² min @ 10 psi |
| Residual Pore Former | <0.1% |
| Burst Strength | 15.8 psi |
| Shrinkage, machine direction | 2.4% |
| Shrinkage, cross machine direction | 0.9% |

The procedure is identical to that used in Example 8. Initial conductivity is $1.2 \times 10^{-1}$ ohm$^{-1}$ cm$^{-1}$. Conductivity decay is as before.

EXAMPLE 10

Comparative Use of the Luttinger Catalyst System to Make Structures of Polyacetylene and Nonporous Kapton ® Polyimide Film A sample of commercially available Kapton ® polyimide film is treated in a fashion identical to the procedure described in Example 8. The conductivity of the doped film is measured, giving an initial value of $2.4 \times 10^{-1}$ ohm$^{-1}$ cm$^{-1}$. Conductivity decays are as before.

No differences in performance are noted in comparison with the microporous polypropylene films.

EXAMPLE 11

Preparation of a Microporous Polypropylene/Polyacetylene Stucture Using a Dry Box Apparatus Rather than a Vacuum Line to Give Microporous Polypropylene/Polyacetylene Structures Using the Shirakawa Catalyst This experiment and the one described in Example 12 are performed exclusively in a dry box apparatus rather than employing both a dry box and a vacuum line.

A dry box is prepared for the experiment first by purging with nitrogen then scrubbing the nitrogen within the chamber with the attached atmosphere purification system. Specifications for the purification system claim a reduction of moisture and oxygen down to less than 1 ppm.

Catalyst solutions are prepared in an open beaker on a stirrer plate in the box. Distilled titanium tetrabutylate, 10.2 g, is poured into a 100-ml beaker containing a stirrer bar, followed by the slow addition of 47 ml of a 25% by weight active solution of triethylaluminum in toluene.

The solution is placed in a 1-liter resin kettle, the top is mounted and a vacuum was slowly applied to remove the gas that is being evolved. The vacuum is kept in place for 20 minutes. The solution is then returned to the beaker.

A sample of microporous polypropylene membrane is then prepared for exposure to the catalyst system. Characteristics of the film are described below.

| MICROPOROUS FILM | |
| --- | --- |
| Bubble Point | 19 psi |
| Maximum Pore | 0.49μ |
| Water Flow | 11.28 ml/cm² min |
| Residual Pore Former | 0.48% |

A 3"×2" sample of the membrane is dried overnight in a vacuum oven at 105° C. This sample, which has been transferred to the dry box, is soaked in the catalyst solution for about three minutes and then is immediately exposed to vacuum in the resin kettle for ten minutes. After this treatment, the sample is observed to be off white.

The resin kettle has been rigged to allow for a continuous flow of acetylene into it. The vacuum is released to acetylene, thus completely blanketing the sample in one atmosphere of this gas. The sample is exposed to acetylene for about ten minutes, followed by a nitrogen sweep. During this period, the sample shrinks slightly and becomes somewhat darker.

The sample is removed from the kettle and washed copiously with freshly distilled toluene until it is evident that no further catalyst was being removed.

The sample is placed in an iodine chamber for doping. The sample, which still remains off-white in the dry state, appears to be conductive as judged by the two point probe method for measuring resistance. Values as low as 500 ohms are measured when touching the sample with probes roughly one cm apart.

The sample exhibits no change in flexibility as compared with untreated microporous polypropylene.

EXAMPLE 12

Preparation of a Microporous Polypropylene/Polyacetylene Structure Using a Dry Box Apparatus Rather than a Vacuum Line to Give Uniform Structures The experimental procedure used in this example is essentially the same as that used in Example 11. Makeup of the catalyst solution is as before, and the treatment procedure is the same except that a vacuum is not used. Dipping the membrane sample in the catalyst solution, followed by exposure to acetylene is repeated four times.

The appearance of the sample is quite different from that in Example 11. After only one exposure, the sample is dark in color, indicating a more uniform deposition of polyacetylene throughout. Multiple exposures give an even darker membrane.

Conductivity of the sample is identical to that for the sample from Example 11. As before, the sample is quite flexible.

EXAMPLE 13

Preparation of a Microporous Polyethylene/Polyacetylene Structure Containing 43 Weight Percent Polyacetylene A sample of microporous polyethylene was prepared for treatment with the catalyst solution. The sample had been characterized, displaying the following membrane properties.

| MICROPOROUS POLYETHYLENE | |
|---|---|
| Thickness | 5.2 mils |
| Maximum Pore Size | 0.52 microns |
| IPA Bubble Point | 17.6 psi |
| Water Flow | 9.25 ml/cm$^2$ min |
| Air Flow | 1.15 l/cm$^2$ min |

A 0.5600 g sample of the above membrane is placed in a dry box via an evacuated antichamber. The Schlenk tube containing the catalyst solution described above is moved into the dry box also. The techniques described following were preformed in the dry box atmosphere, which was purified and dried nitrogen.

A 50 ml aliquot of the catalyst solution is diluted with 50 ml of freshly distilled toluene in a beaker. The solution is stirred for five minutes, and then the polyethylene sample is placed in the solution. The catalyst solution immediately penetrates the microporous structure—even so, the sample is allowed to soak for 2 minutes. The sample is then allowed to dry in the box under blowing nitrogen for 10-15 minutes giving a membrane with the catalyst components deposited within the pore structure of the polypropylene. The sample is placed in an empty Schlenk tube and removed from the box.

After iodine doping the conductivity is 11.21 ohm$^{-1}$ cm$^{-1}$.

EXAMPLE 14

Preparation of a Microporous Polyvinylidene Fluoride/Polyacetylene Structure Containing 17% Polyacetylene A 1.2992 gram sample of a microporous polyvinylidene fluoride (PVDF) membrane having the following properties:

| MICROPOROUS PVDF MEMBRANE | |
|---|---|
| Thickness | 10.4 mils |
| Maximum Pore Size | 0.52 microns |
| IPA Bubble Point | 18.7 psi |
| Water Flow | 0.09 l/min cm$^2$ |
| Air Flow | 0.44 ml/min cm$^2$ | is dipped in a catalyst solution prepared as in Example 13, and the acetylene polymerization is carried out in the same manner. Sample weight after catalyst removal is 1.5690 grams; thus, the structure contains 17% polyacetylene. After iodine doping the conductivity is $1.09 \times 10^{-2}$ ohm$^{-1}$ cm$^{-1}$. Conductivity after ten days in air is $4.4 \times 10^{-4}$ ohm$^{-1}$ cm$^{-1}$, indicating conductivity decay as before.

EXAMPLE 15

Comparative Attempt at Preparation of a Non-porous Polyethylene Film/Polyacetylene Structure Containing 5 Percent Polyacetylene A 0.5600 gram sample of polyethylene film is treated with the catalyst solution of Example 13 with noticeable swelling of the polyethylene film and exposed to acetylene in an identical manner. Color change for the sample is minimal; after iodine doping the conductivity is $1.56 \times 10^{-1}$ ohm$^{-1}$ cm$^{-1}$. Following ten days exposure in air the conductivity is $3.1 \times 10^{-3}$ ohm$^{-1}$ cm$^{-1}$.

EXAMPLE 16

Comparative Attempt at Preparation of a Non-porous Flurocarbon Film/Polyacetylene Structure Containing 2.3% Polyacetylene A fluorocarbon web (Tefzel ®) weighing 0.6752 grams is dipped in the catalyst solution of Example 13 then exposed to acetylene using the same procedure. After catalyst removal and drying the sample weighs 0.6931 grams. After iodine doping the sample's conductivity is $1.14 \times 10^{-3}$. Following two weeks exposure in air the conductivity is $4.6 \times 10^{-5}$ ohm$^{-1}$ cm$^{-1}$.

EXAMPLE 17

Preparation of a Microporous Polypropylene/Polyacetylene Structure Containing 32% Polyacetylene A microporous polypropylene sample having membrane properties virtually identical to those in the previous examples is dipped in the catalyst solution of Example 13 and exposed to acetylene. The initial weight is 0.9916 grams; after exposure, catalyst removal and drying the weight is 1.4573 grams. After iodine doping the conductivity is 1.59 ohm$^{-1}$ cm$^{-1}$. Following ten days of air exposure the conductivity becomes $4.8 \times 10^{-2}$ ohm$^{-1}$ cm$^{-1}$.

EXAMPLE 18

Comparative Attempt at Preparation of a Non-porous Polypropylene-co-ethylene Film/Polyacetylene Structure Containing 12% Polyacetylene An 0.8849 gram sample of a polypropylene-co-ethylene film, which contains mostly propylene—is dipped in the catalyst solution of Example 13, accompanied with swelling of the film, and exposed to acetylene. After catalyst removal and drying the sample weighs 1.0063 grams. After iodine doping and catalyst removal the sample's conductivity is $1.45 \times 10^{-1}$ ohm$^{-1}$ cm$^{-1}$.

Following ten days exposure in air the conductivity becomes $1.45 \times 10^{-3}$ ohm$^{-1}$ cm$^{-1}$.

EXAMPLE 19

Comparative Attempt at Preparation of a Non-porous Polyethylene Terephthalate (PET) Film/Polyacetylene Structure Samples of PET are dipped into the catalyst solution of Example 13 and exposed to acetylene; however, the solvent apparently does not swell the PET enough to impregnate any catalyst; consequently, although a small amount of acetylene polymerization does occur on the surface, the weight gains were less than 0.5 percent. "Iodine doped" samples do not exhibit significant conductivities.

EXAMPLE 20

Preparation of a Polypropylene/Polyacetylene Structure Treated with Ascorbic Acid The product of Example 4 was allowed to soak at room temperature in pentane which had been saturated with ascorbic acid to produce a product with increased stability against oxidation.

Figure 11:
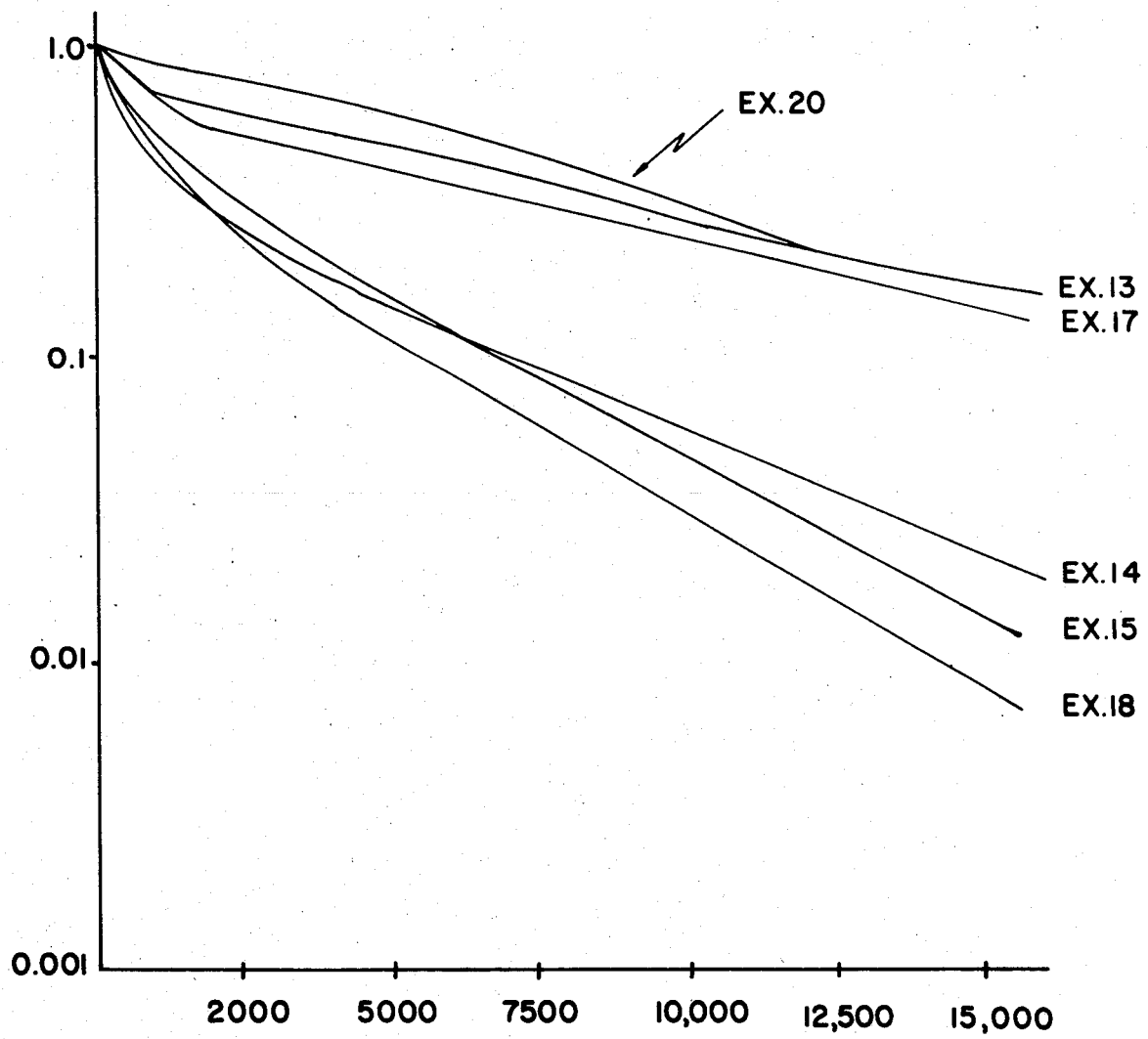
FIG. 11 is a comparative conductivity decay curve of certain structures of the present invention and certain other structures.

FIG. 11 is a conductivity decay curve showing the decrease in conductivity, with time, using the starting conductivity as 1.0 for each of the products of Examples 13 through 18 and 20.

EXAMPLE 21

Use of Polypropylene/Polyacetylene Membranes in Electrodialysis

As previously indicated, the electrically conductive membranes of the present invention may be employed as electrodialysis membranes. The separation of electrolytes from solutions via electrodialysis techniques is well known and has been employed for various purposes. For example, U.S. Pat. No. 4,253,929 is concerned with the use of electrodialysis to denitrate aqueous tobacco extract. An arrangement or stack of membranes useful in the electrodialysis process is shown in U.S. Pat. No. 4,303,493.

Figure 12:
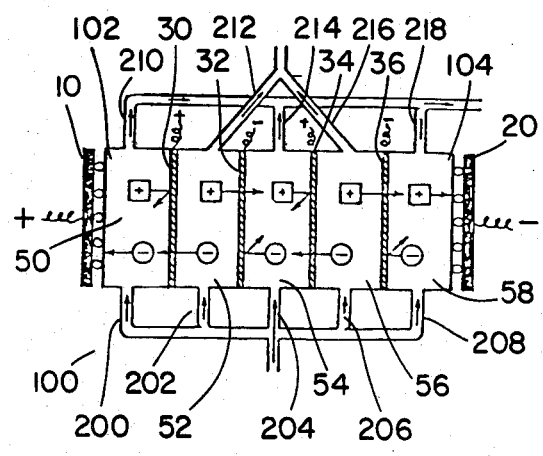
FIG. 12 is a cross-sectional view of an electrodialysis cell of the present invention.

One possible physical arrangement of membranes of the present invention useful in an electrodialysis process is shown in FIG. 12. In that figure electrodes 10 and 20 are capable of passing a current of, for example, five amperes, when a suitable voltage is applied. Membranes 30, 32, 34, and 36 are electrically conductive membranes of the present invention. Means are provided for inducing a suitable primary potential across electrodes 10 and 20 and for inducing a suitable secondary potential between each pair of opposite facing membranes 30, 32, 34, and 36. The secondary potential is lower than the primary potential across electrodes 10 and 20 so that overall ion migration toward the two electrodes is not inhibited.

In FIG. 12, membranes 30 and 34 have a positive secondary potential and electrodes 32 and 36 have a negative secondary potential. The placement of the membranes within chamber 100 is such that membrane 30 and chamber wall 102 define two sides of subchamber 50. Likewise membranes 30 and 32 define two sides of subchamber 52, membranes 32 and 34 define two sides of subchamber 54, membranes 34 and 36 define two sides of subchamber 56, and membranes 36 and chamber wall 104 define two sides of subchamber 58.

In operation an electrolyte feed solution may be introduced into chambers 50, 52, 54, 56, and 58 through inlets 200, 202, 204, 206, and 208, respectively. The feed solution may be withdrawn from said chambers via outlets 210, 212, 214, 216, and 218, respectively. Outlets 210, 214, and 218 will pass a solution which has been concentrated in electrolytes, whereas outlets 212 and 216 will pass a liquid which has reduced electrolyte content over the feed solution.

The degree of electrolyte reduction in the product solution passing through outlets 212 and 216 will depend upon many factors including the flow rate of the feed solution into the system and the migration rate of the electrolyte in the respective chambers.

In actual operation, the potential applied to membrane 30 blocks migration of positive electrolytes out of chamber 50, while allowing negative electrolytes from chamber 52 to migrate through membrane 30 into chamber 50. Similarly, the potential applied to membrane 32 allows positive electrolytes to migrate into chamber 54, while blocking migration of negative electrolytes into chamber 52 from chamber 54.

The potential applied to membrane 34 blocks migration of positive electrolytes from chamber 54 while allowing negative electrolytes to migrate from chamber 56 into chamber 54. Likewise, the potential applied to membrane 36 blocks the migration of negative electrolytes from chamber 58 while allowing positive electrolytes to migrate into chamber 58 from chamber 56.

What is claimed is:

1. A method for increasing the electrical conductivity of microporous polypropylene comprising the following steps:
    (a) contacting said microporous polyproylene with a solution of a Ziegler-Natta acetylene polymerization catalyst in a suitable solvent which does not interact any way with said microporous polypropylene and allowing said solution to penetrate throughout the porous structure of said micoroporous polypropylene;
    (b) exposing said microporous polypropylene having catalyst throughout its porous structure to acetylene to form polyacetylene within the porous structure on the polymeric surface but not within the polymer network itself; and
    (c) doping the resultant product with either an electron donor dopant or an electron acceptor dopant.

2. The method of claim 1 wherein said solvent is removed from said porous structure of said microporous polypropylene and a deposit of said catalyst is left within the porous structure of said micorporous polypropylene prior to the exposure of said microporous polypropylene to acetylene in step (b).

3. The method of claim 2 wherein said solvent is removed by drying.

4. The method of claim 1 wherein the steps are performed at or below room temperature.

5. A composition comprising polyactylene deposited throughout the porous structure of microporous polypropylene, said polyacetylene being deposited on the polymeric surface of said microporous polypropylene, but not within the polymer network itself, said polyacetylene being doped with either an electron donor dopant or an electron acceptor dopant.

6. The composition of claim 5 wherein the composition comprises from about 16 to about 70% polyacetylene in microporous polypropylene.

7. The composition of claim 5 wherein the composition comprises from about 20 to about 40% polyacetylene in microporous polypropylene.

* * * * *